Oct. 14, 1924.
C. M. LARSON ET AL
1,511,998
VISCOSIMETER
Filed July 13, 1923
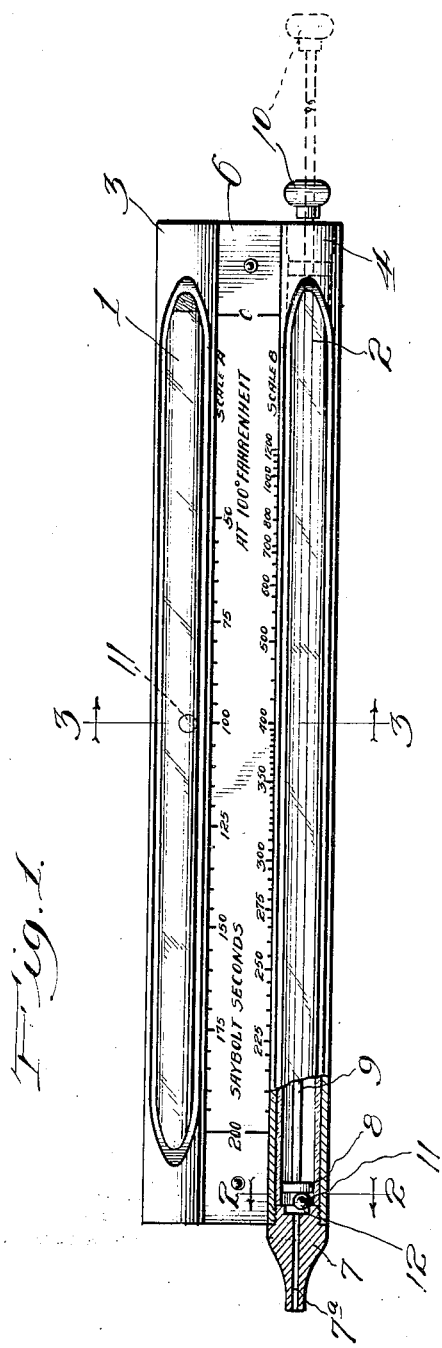
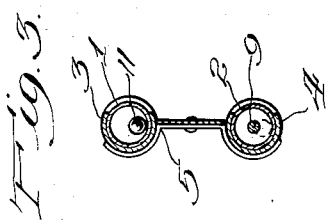
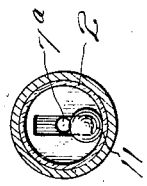
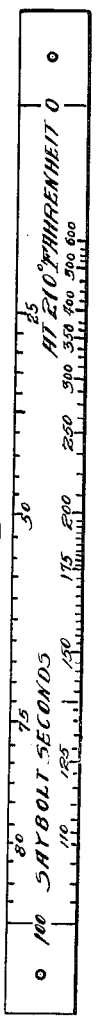

Patented Oct. 14, 1924.

1,511,998

UNITED STATES PATENT OFFICE.

CLIFFORD M. LARSON AND CARL L. KNOPF, OF CHICAGO, ILLINOIS.

VISCOSIMETER.

Application filed July 13, 1923. Serial No. 651,255.

*To all whom it may concern:*

Be it known that we, CLIFFORD M. LARSON and CARL L. KNOPF, both citizens of the United States, residing in the city of Chicago, county of Cook, and State of Illinois, have invented certain new and useful Improvements in Viscosimeters, of which the following is a specification.

This invention relates to improvements in viscosimeters, and refers more particularly to a device for ascertaining the viscosity of oils by comparison with an oil of a known viscosity.

This application is an improvement of our prior application Serial No. 452,340 filed April 4th, 1921.

Among the objects of the invention are to provide a self-filling, self-cleaning device whereby oil to be tested may be drawn into the secondary tube or comparison tube, wherein it is held during the testing operation; to provide a device in which the viscosity of the oil may be ascertained in Saybolt seconds or according to the Engler, absolute or Redwood methods, it being necessary only to change the scale between the master tube and the test tube in order to procure the different types of readings.

Fig. 1 is a face view of the device. Fig. 2 is a view taken along the line 2—2 in Fig. 1. Fig. 3 is a view taken along the line 3—3 in Fig. 1. Fig. 4 is a face view of the scale showing Saybolt seconds at 210° F.

Referring to the drawings, the device consists of a master tube 1 and a test or secondary tube 2 mounted in an armored metallic cylinder 3 and 4 respectively, the faces of the cylinders being cut away to expose the glass tubes. These cylinders are joined by means of a web or frame 5. Between the cylinders is a scale 6 shown in the drawings as a scale for recording viscosities in Saybolt seconds at 100° F.

The glass tube 1 is filled with an oil of a known viscosity, while into the tube 2 is drawn the oil to be tested through the nozzle arrangement shown at 7, and by means of the suction imposed by the plunger 8 mounted upon the piston rod 9 extending substantially the length of the tube. On the opposite end of the rod from the plunger is a knob 10 which is used in reciprocating the plunger in order to draw the oil into the tube. In each tube is a small sphere or shot 11 preferably metallic or any desired material, it being of importance only that the sphere be heavier or of greater density than the oil.

When the lower test tube 2 has been drawn full of oil to be tested, the shot or spherical members are rolled to the end of the tubes adjacent the zero mark on the scale. It will be noted that the plunger when drawn to the extreme end of the tube in sucking the oil into the tube, has sufficient travel to prevent the accumulation of air in the lower test tube which would effect the viscosity readings. The balls are started from the zero mark and by inclining the tubes flow toward the opposite ends of the tubes. The viscosity of the oils determine the rapidity of the travel of the balls or spheres, the readings being taken when the first ball reaches the 200 mark on the scale, that is, if the ball of the lower tube reaches the 200 mark while the ball in the upper tube has only traveled to the 100 mark, the reading is made on the scale A. on the upper edge of the scale which would be 100. If however, the ball in the upper tube travels to the 200 mark while the ball in the lower tube travels only half-way or opposite the 400 mark on the scale B., the reading is made on the scale B. along the upper edge which would be 400.

In testing cylinder stock, the oil in the master tube could be changed so as to check oil having Saybolt readings at 210° F., such as shown in the scale in Fig. 4. Also, the scale would necessarily have to be changed for this type of testing.

A general rule in making readings of viscosity on this device is that whichever ball reaches the end of the tube first, the reading is made in line with the ball in the opposite tube on the scale adjacent the tube in which the ball is traveling.

Any fluid may be used in the master tube. The fluid should be so chosen however, that it corrects for temperature changes, that is, the oil should be chosen as to compensate for errors due to changes in temperature. Such an oil is normally a mixture of asphalt and paraffine base oils. The capillary tube nozzle designated as 7 having the orifice 7ᵃ through which the oil is drawn, prevents the oil from running out when the tubes are inclined in making readings.

A narrow slot 12 is cut in the nozzle and communicates with the duct or orifice 7ᵃ which prevents the metallic sphere from seating in the orifice and thereby preventing the discharge of the oil from the test tube.

The device is simple and accurate when properly manipulated and is adaptable to innumerable uses in testing different characters of oil.

It is particularly adapted to testing crank case oil in order to ascertain the degree of dilution.

We claim as our invention:

1. In a device for ascertaining the fluidity of liquids, the combination with parallel tubes, one of said tubes having a liquid of a predetermined fluidity therein, of suction means for drawing the liquid to be tested into the adjacent tubes, means movable with the inclination of the tubes and mounted therein, the relative speed of said movable means through the respective mediums registering the fluidity with the inclination of the tubes.

2. In a device for ascertaining the fluidity of liquids, the combination with parallel tubes, one of said tubes having a liquid of a predetermined fluidity therein, of suction means for drawing the liquid to be tested into the adjacent tube, movable means mounted in the tubes of greater density than the liquids, the relative speed of said movable means through the respective mediums registering the fluidity with the inclination of the tubes.

3. In a device for ascertaining the fluidity of liquids, the combination with parallel tubes, one of said tubes having a liquid of a predetermined fluidity therein, of suction means for drawing the liquid to be tested into the adjacent tube, movable means mounted in the tubes of greater density than the liquid in the separate tubes, a graduated scale between the tubes whereby with the inclination of the tubes the relative speed of said movable means through the respective mediums is registered upon the scale.

4. In a device for ascertaining the fluidity of liquids, the combination with parallel tubes, one of said tubes having a liquid of a predetermined fluidity therein, of suction means for drawing the liquid to be tested into the adjacent tube, movable means mounted in the tubes of greater density than the liquid in the separate tubes, a graduated scale for determining viscosities in Saybolt seconds positioned between the tubes whereby the relative speeds of the movable means through the respective mediums is registered in Saybolt seconds on the scale.

5. In a device for ascertaining the fluidity of liquids, the combination with substantially parallel tubes, one of the said tubes having a liquid of a predetermined fluidity therein, of means for drawing the liquid to be tested into the adjacent tube, means movable with the inclination of the tubes, and mounted therein, the relative speed of said means through the respective mediums registering the fluidity with the inclination of the tubes.

CLIFFORD M. LARSON.
CARL L. KNOPF.